United States Patent [19]

Freier

[11] Patent Number: 5,118,215

[45] Date of Patent: Jun. 2, 1992

[54] PIPE CLIP

[75] Inventor: Fred Freier, Baretswil, Switzerland

[73] Assignee: Egli, Fischer & Co. AG, Zurich, Switzerland

[21] Appl. No.: 379,797

[22] Filed: Jul. 17, 1989

[30] Foreign Application Priority Data

Jul. 18, 1988 [CH] Switzerland .................. 02740/88

[51] Int. Cl.$^5$ ............................................. F16L 3/08
[52] U.S. Cl. ............................ 403/405.1; 403/344; 248/74.2; 248/316.5
[58] Field of Search ............... 248/74.2, 74.3, 73, 248/316.5, 74.5; 24/16 PB; 403/405.1, 406.1, 344

[56] References Cited

U.S. PATENT DOCUMENTS

| 3,266,109 | 8/1966 | Thomas . | |
|---|---|---|---|
| 3,913,187 | 10/1975 | Okuda | 248/74.3 X |
| 4,061,299 | 12/1977 | Kurosaki | 248/73 |
| 4,502,186 | 3/1985 | Clarke et al. | 24/16 PB |
| 4,663,807 | 5/1987 | Bozzo | 24/16 PB X |
| 4,762,296 | 8/1988 | Kraus et al. | 248/74.2 |
| 4,802,646 | 2/1989 | Cattani | 248/316.5 |
| 4,840,345 | 6/1989 | Neil et al. | 248/74.2 |
| 4,955,574 | 9/1990 | Freier | 248/316.5 |

FOREIGN PATENT DOCUMENTS

| 3014578 | 11/1981 | Fed. Rep. of Germany | 248/74.2 |
| 643338 | 5/1984 | Switzerland . | |
| 2162416A | 2/1986 | United Kingdom . | |
| WO85/03493 | 2/1985 | World Int. Prop. O. . | |

Primary Examiner—Peter M. Cuomo
Attorney, Agent, or Firm—Finnegan, Henderson, Farabow, Garrett & Dunner

[57] ABSTRACT

A pipe clip comprising a baseplate, a pair of opposed arcuate-shaped strap segments, struts pivotally connecting the two segments to the baseplate at a point intermediate their ends to divide the strap segments into an inner end portion and an outer end portion, and mutually engageable toothed closure tongues on the outer end portions of the strap segments to lock the straps in place around a pipe. The closure tongues on the outer end portion of one segment comprise a plurality of external teeth and the closure tongues on the outer end portion of the other a plurality of internal teeth so that when the closure tongues is engaged around a pipe, the straps are symmetrical with the axis of the pipe being held.

3 Claims, 2 Drawing Sheets

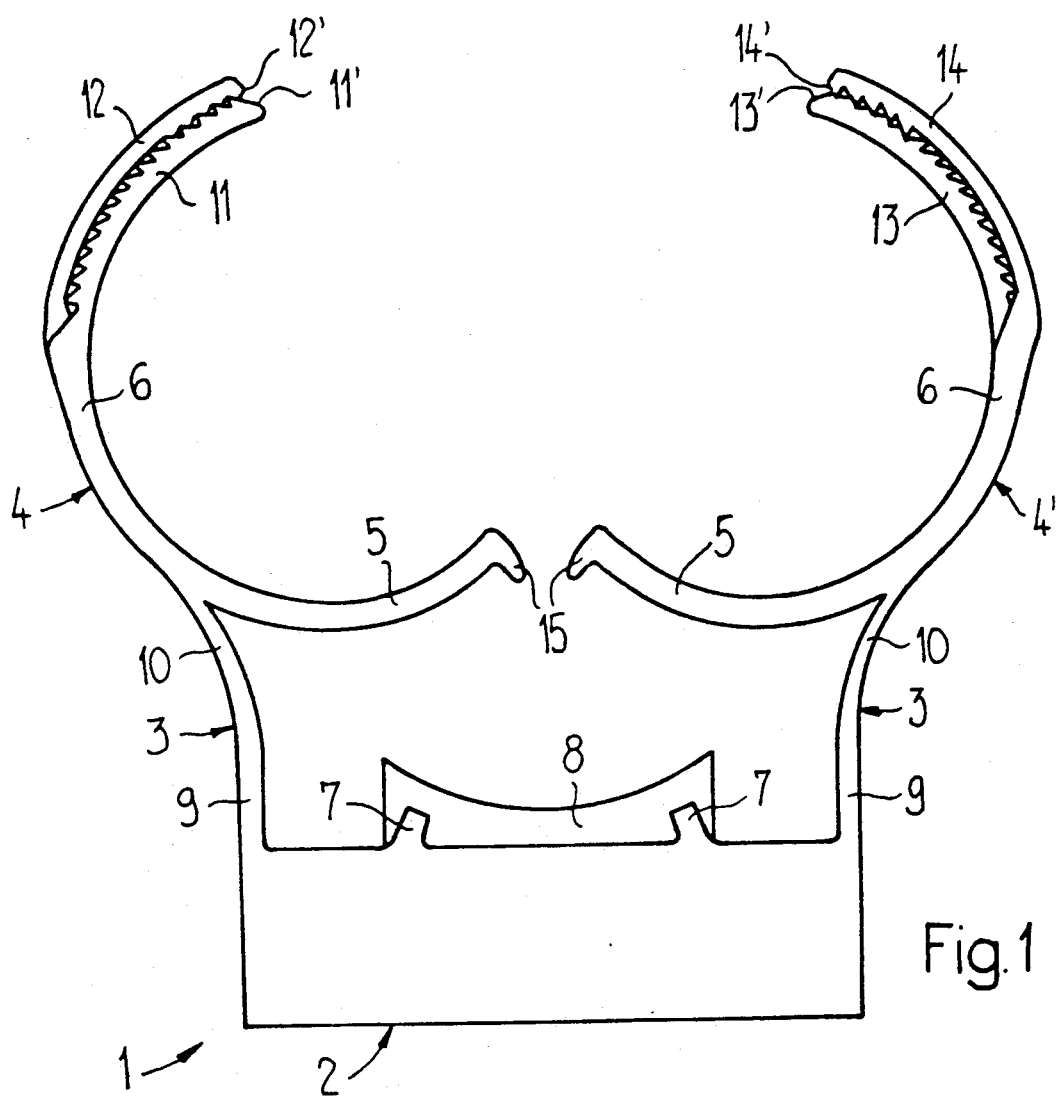
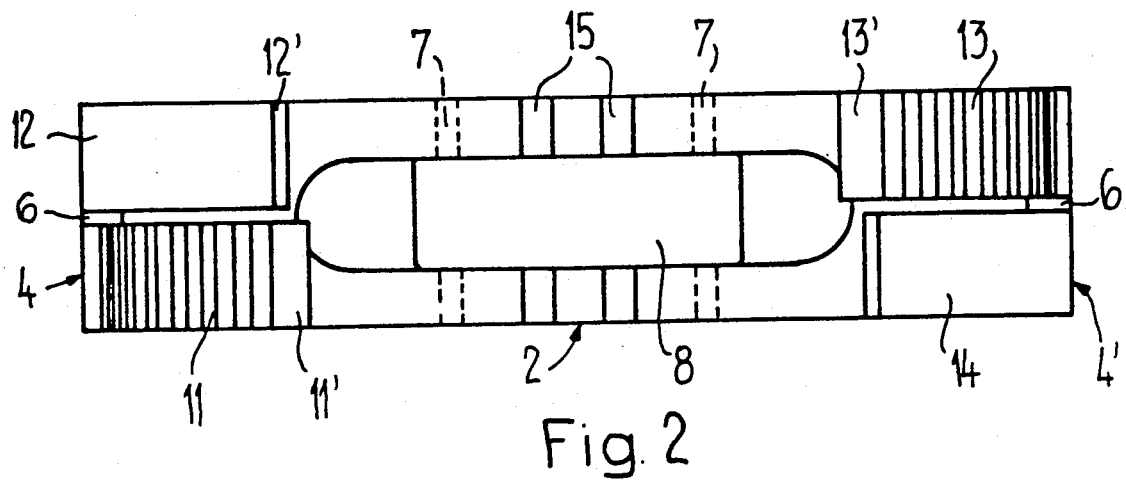

PIPE CLIP

BACKGROUND OF THE INVENTION

The present invention relates to a pipe clip. More particularly, the present invention relates to a pipe clip of unitary construction having two opposed strap segments pivotally connected to a baseplate that embrace a pipe to be held by the clip and that are locked in place by cooperating teeth on their end portions remote from the baseplate forming an engageable closure means.

A pipe clip of this kind is shown for example in Swiss Patent No. 643,338. On one strap segment of this pipe clip an external toothing arrangement comprising one tooth is provided, while the other strap segment carries an internal toothing arrangement comprising two teeth A closure construction of this kind thus enable pipes of two different sizes to be fastened. For the purpose of holding pipes of other sizes the number of internal teeth could, of course, be increased. In the case of large pipes, however, a cavity will then be formed between the pipe and the unused part of the internal toothing, so that the pipe would not be gripped all around with close contact. The support of this pipe clip is thus uneven in relation to a center plane in the longitudinal direction of the pipe. This may also have the consequence that the teeth cannot be brought into clean engagement except with difficulty when large transverse forces exist.

The present invention therefore seeks to provide a pipe clip in which the closure means avoids these disadvantages.

SUMMARY OF THE INVENTION

This object is achieved in accordance with the present invention by providing a pipe clip comprising a baseplate, a pair of opposed arcuate-shaped strap segments, means pivotally connecting the two segments to the baseplate at a point intermediate their ends to divide the strap segments into an inner end portion and an outer end portion, and mutually engageable toothed closure means on the outer end portions of the strap segments to lock the straps in place around a pipe, the closure means on the outer end portion of one segment comprising a plurality of external teeth and the closure means on the outer end portion of the other a plurality of cooperating internal teeth so that when the closure means is engaged around a pipe the strap segments are symmetrical with the axis of the pipe being held.

BRIEF DESCRIPTION OF THE DRAWINGS

Further objects and advantages of the invention will appear from the following description of an embodiment of the invention as shown in the accompanying drawings in which:

FIG. 1 is an elevational view of the pipe clip of the invention;

FIG. 2 is a top plan view thereof;

DETAILED DESCRIPTION OF THE INVENTION

Figure 4:
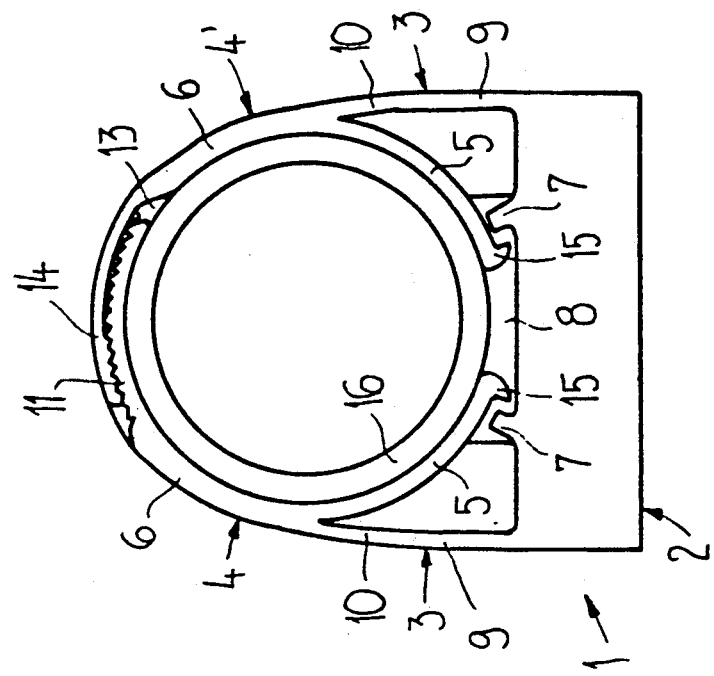
FIG. 4 is a view of the pipe clip shown in FIG. 1 with the pipe inserted.

The pipe clip shown in FIG. 1 is of unitary construction and consists of a fastening or body part 1 having a baseplate 2 to which are integrally connected two flexible connecting struts 3 on either side. The ends of the connecting struts 3 remote from the baseplate 2 are integrally connected to two opposed arcuate-shaped strap segments 4, 4', the point of connection dividing the straps into an inner or lower end portion 5 and an outer or upper end portion 6.

Baseplate 2 has stop bosses 7 and an abutment 8, the purpose of which will be explained more fully below in connection with the insertion of a pipe.

The connecting struts 3 are flexible, like leaf springs, and they thus provide a means for pivotally connecting the strap segments 4, 4' to the baseplate as a result of the deformability of the connecting struts. In a portion 9 adjacent the baseplate 2, the struts are thicker than at the portion 10 adjacent the straps 4, 4' so that, despite their slender shape, they do not tend to buckle or bulge out. In addition, connecting struts 3 curve outwardly so that the strap segments 4, 4' tend to remain open in a V-shaped position so that a pipe can be inserted into the opening and placed between them.

The outer end portions 6 of each strap segment 4, 4' end in two parallel closure tongues 11, 12 and 13, 14, which are provided with mutually engageable toothed closure means. As embodied, this means comprises a plurality of external serrated teeth on tongue 11 of strap 4 that cooperate with a plurality of internal teeth on tongue 14 of strap 4' and a plurality of external teeth on tongue 13 of strap 4' that cooperate with a plurality of internal teeth on tongue 12 of strap 4 to thus assume a locking position. The closure tongues 11, 13 provided with external teeth have a longer toothed area than tongues 12 and 14 to provide the closure means with an engagement range adequate for different pipe diameters. The free ends of the closure tongues 11, 12, 13, 14 and are provided with beveled surfaces 11', 12', 13', 14' which are identical but oppositely disposed, in order to facilitate correct sliding of the cooperating closure tongues 11, 14 and 12, 13 respectively over one another.

The closure tongues on each strap preferably are adjacent one another so that they cannot be readily displaced transversely to their longitudinal direction to such an extent that the teeth can come out of engagement. This prevents in particular the opening of the closure means if the pipe is turned about an axis at right angles to the baseplate.

The inner end portions 5 of each strap segment 4, 4' have hooks 15 which engage against the stop bosses 7, to prevent overloading of the connecting struts 3 when heavy pipes are inserted into the clip. In addition the curvature of the inner end portions is greater and they are of relatively stiffer construction than the outer end portions 6, with the consequence that, when stressed by an inserted pipe, they will merely yield in order to adapt to the contour of the pipe.

The inner end portions 5 are forked as shown in FIG. 2, so that a tool can be applied to fastening means, not shown, such as screws or the like for mounting the pipe clip to a wall or similar surface.

Figure 3:
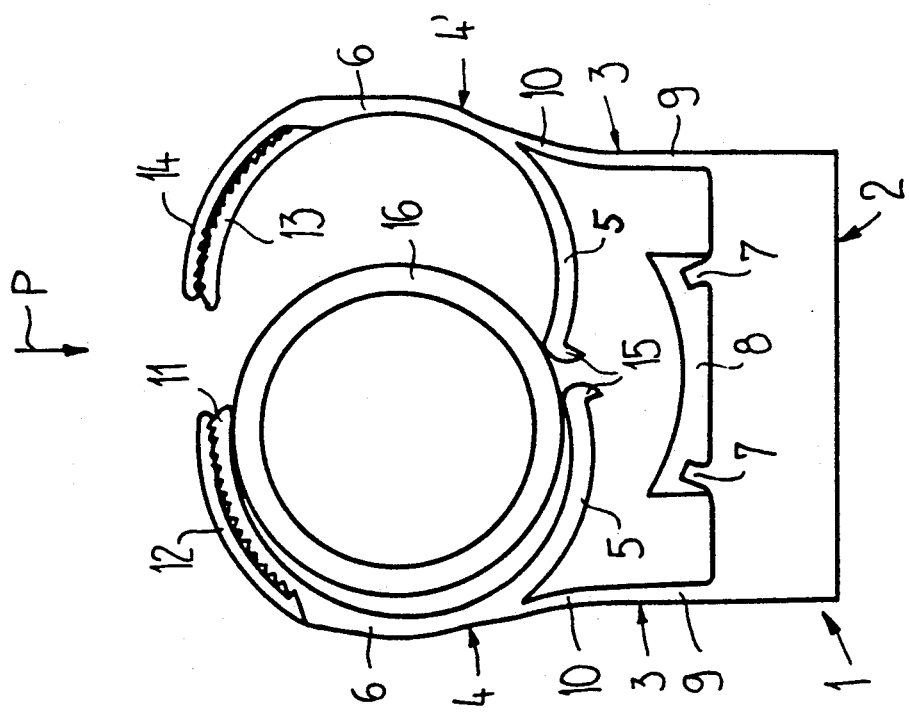
FIG. 3 is a view of the pipe clip shown in FIG. 1 into which a pipe is being inserted.

FIG. 3 shows the situation when a pipe 16 is inserted into the clip. The pipe 16, which is pressed into the clip in the direction of the arrow P, applies to the end portions 5 a force directed towards the baseplate 2 with the consequence that a moment acts on the strap segments 4, 4', which are initially being held in an open position. Since the connecting struts 3 are rigidly connected to the strap segments 4, 4', a bending movement is applied to them and brings about their deformation, with the consequence that they bend inwards towards each other in a closing direction. The points at which the connecting struts 3 are connected to the strap segments 4, 4' thus move inward towards one another, which in turn means that the strap segments 4, 4' close up from the open V-position and move towards one another in the manner of tongs, thus increasingly gripping the pipe 16 between them. This movement is additionally assisted by the greater curvature and stiffer construction of the inner end portions 5.

FIG. 3 shows the case in which lateral forces additionally act, so that the pipe 16 is offset laterally towards one of the strap segment 4, as readily occurs in practice when heavy, unwieldy pipes 16 are used. The mounting force directed towards the baseplate 2 has, however, the effect of closing up the strap segment 4 as described above, and thus guides the pipe 16 toward segment 4 as described above, and thus guides the pipe 16 towards the center of the pipe clip against the action of the lateral forces. The inner end portions 5 are in turn increasingly pressed down to the same extent by the pipe 16, with the consequence that the closure tongues 11, 12, 13, 14 meet at the same height at the halfway point, so that the position of readiness for locking is reached. Since the radius of curvature of the strap segments 4, 4' is smaller than the radius of the pipe 16 which is to be gripped, the latter is embraced by the free ends of the closure tongues 11, 12, 13, 14 which lie snugly against the pipe 16. If the pipe 16 is then pressed only slightly further into the pipe clip, the tooth closure tongues will engage with one another to lock the pipe in place in a reliable and secure manner. By providing a double closure formed by the pairs of closure tongues 11, 14 and 12, 13, the reliability of the locking action is increased and the closure will not open even if the pipe 16 is only loosely embraced by the strap segments 4, 4' after the first engagement of the closure tongues.

FIG. 4 shows the pipe clip with the pipe 16 inserted and locked in place. Together with the closure tongues 11, 12, 13, 14, the outer end portions 6 form a loop which encloses the pipe 16. In order to provide protection against excessive forces acting on the pipe 16, use is made of the abutment 8 and the stop bosses 7, which protect the end portions 5 and, indirectly, the connecting struts 3 against overelongation.

By providing two pairs of closure tongues, in every locked position a plurality of teeth engage one another, so that the holding force is distributed over a plurality of teeth and thus the flowing of the plastic material of the clip can be avoided even under heavy loads, such as may occur in the event of vibration or pulsating forces.

As shown in FIG. 4, when the teeth are engaged, the bevels 12', 14' on the tongues 12 and 14 lie against a flat portion of a tooth on closure tongues 11 and 13 and do not project beyond the flank of the next tooth. Thus unwanted opening of the closure means, for example with a screwdriver or a coin, can be prevented, because there is no surfaces to which such objects can be applied. In addition, opening of the closure means of the pipe clip is made difficult by the fact that, because there is only a slight lateral distance between the closure tongues, the latter cannot be moved sufficiently far in the transverse direction relative to each other to enable the teeth to become disengaged.

The closure tongues may also be provided on the strap segments of a pipe clip of the type shown in Swiss Patent No. 643,338, in which the strap segments are each connected by a hinge to the body of the clip.

I claim:

1. A pipe clip comprising a baseplate, a pair of opposed arcuate-shaped strap segments, means pivotally connecting each segment to the baseplate at a point intermediate their ends to divide the strap segment into a lower end portion and an upper end portion, said connecting means maintaining the lower end portions adjacent each other and the upper end portions apart, and mutually engageable toothed closure means on the outer ends of the upper end portions of the strap segments remote from the baseplate to lock the straps in place around a pipe, said closure means comprising two separate pairs of locking tongues on the outer ends of the upper end portions of the strap segments disposed in parallel and side-by-side relationship with respect to the axis of the pipe to be held, one tongue of one pair on one strap having internal teeth and the tongue of the other pair on the same strap having external teeth, while the two tongues on the upper end portion of the other strap are of similar and complimentary toothed configuration to provide said two pairs of mutually engageable locking tongues, whereby the force of inserting a pipe into the clip against the adjacent lower end portions of the strap segments brings the upper end portions of each strap toward each other and the two pairs of complimentary toothed tongues into locking engagement.

2. The pipe clip of claim 1, wherein the teeth have a flank portion and flat portion between each flank portion and the tongue of each strap segment having internal teeth has at its free outer end a beveled surface shaped to lie against and equal to or shorter in length than the flat portion of the external teeth on its complimentary tongue on the other strap segment when the closure means are engaged.

3. The pipe clip of claim 1, which is of unitary construction and wherein the means pivotally connecting the strap segments to the baseplate comprises a flexible connecting strut integrally connected between the segment and the baseplate.

* * * * *